Feb. 23, 1932.  J. P. WALKER  1,846,376
FLUID CONTROL FOR GAS AND LIQUID SEPARATORS
Filed Dec. 5, 1929  5 Sheets-Sheet 1

Inventor
Jay P. Walker

Feb. 23, 1932.                J. P. WALKER                1,846,376
              FLUID CONTROL FOR GAS AND LIQUID SEPARATORS
                  Filed Dec. 5, 1929        5 Sheets-Sheet 2
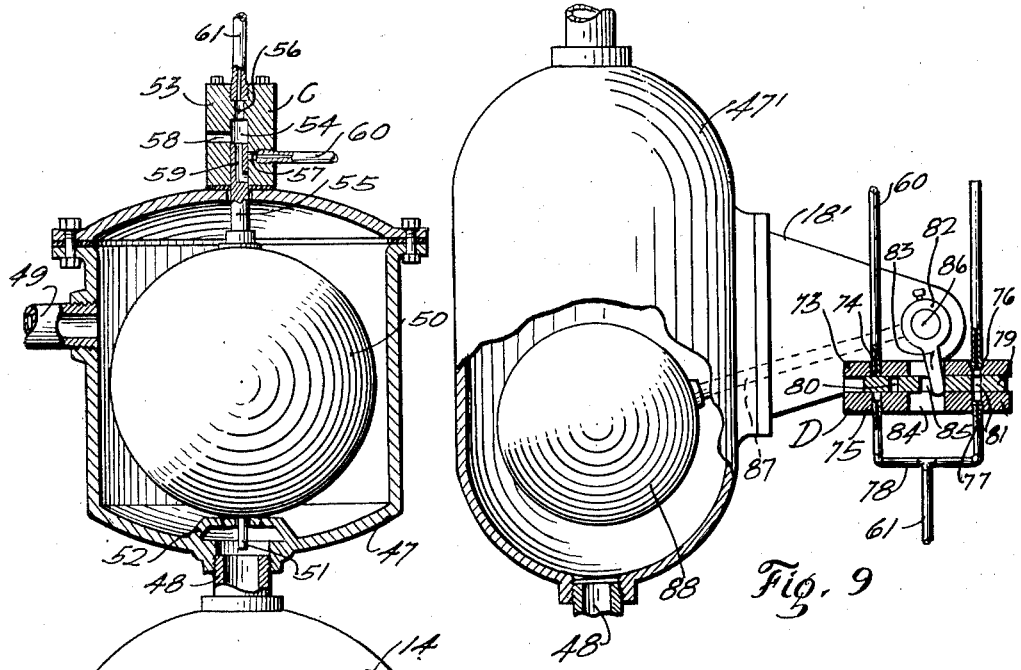
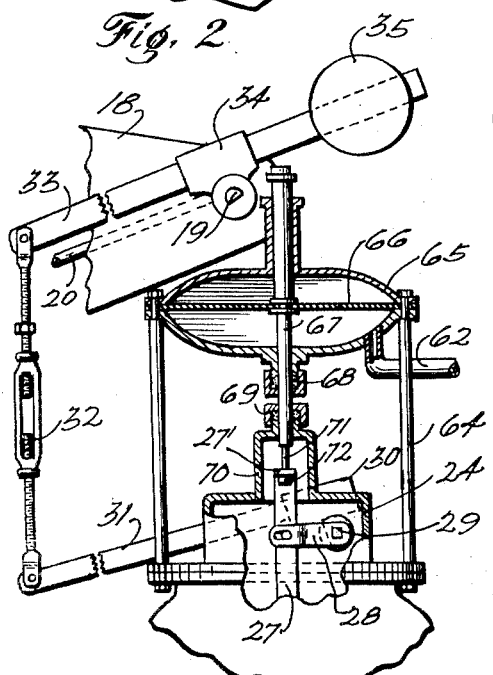
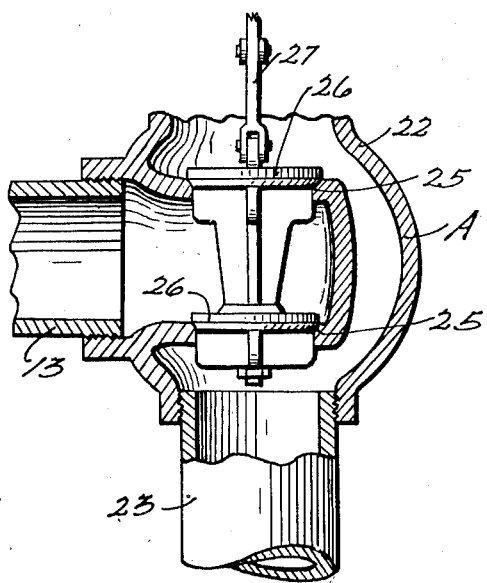
Inventor
Jay P. Walker
By Jack A. Ashley
Attorney

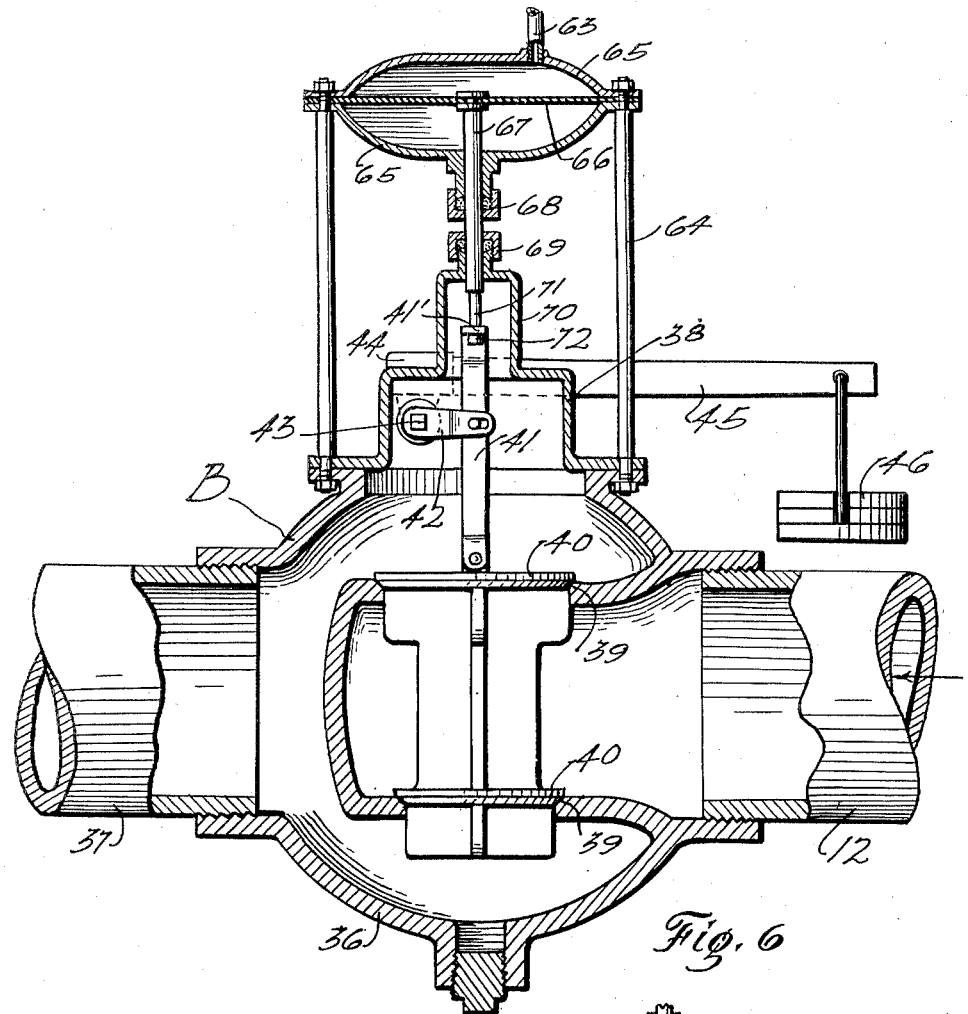
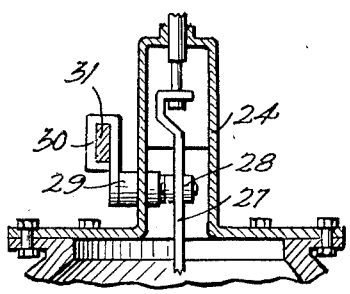
Fig. 5
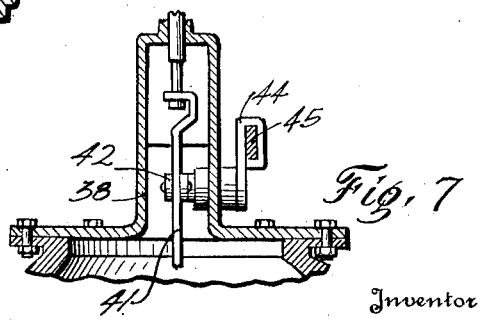
Fig. 7
Inventor
Jay P. Walker

Inventor
Jay P. Walker

Feb. 23, 1932.   J. P. WALKER   1,846,376
FLUID CONTROL FOR GAS AND LIQUID SEPARATORS
Filed Dec. 5, 1929   5 Sheets-Sheet 5
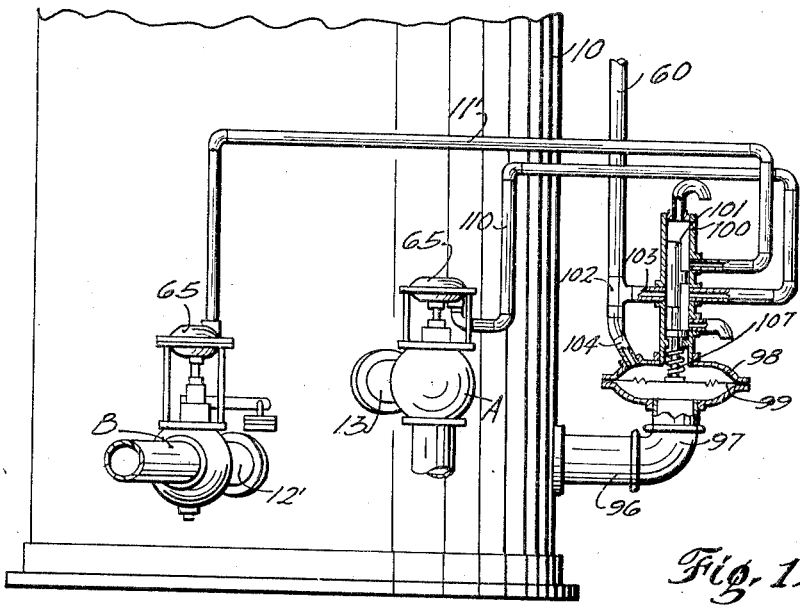
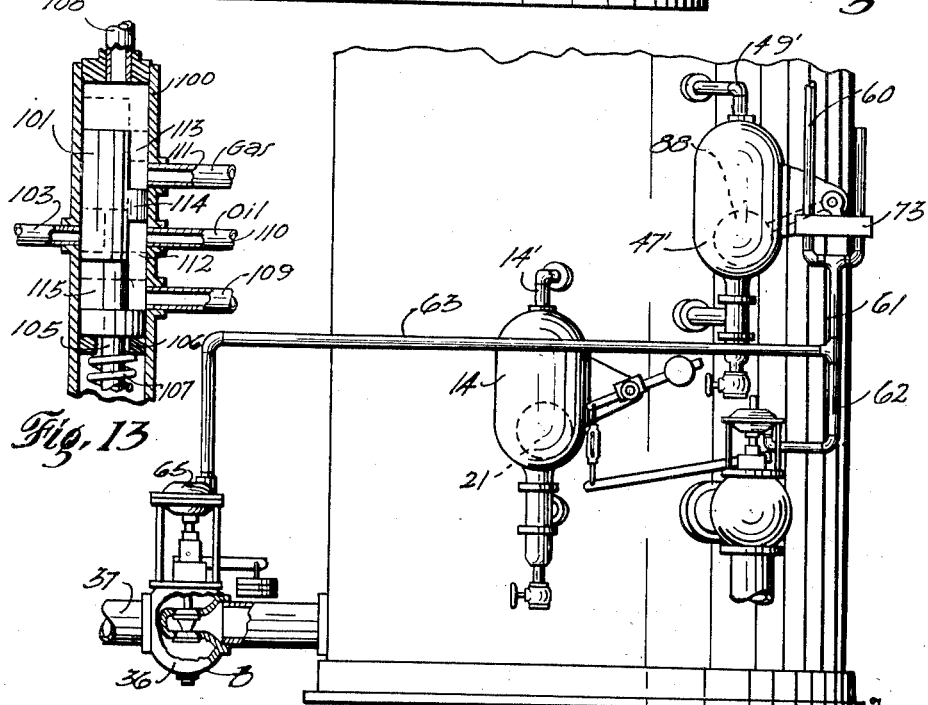
Jay P. Walker Patented Feb. 23, 1932

1,846,376

UNITED STATES PATENT OFFICE

JAY P. WALKER, OF TULSA, OKLAHOMA, ASSIGNOR OF FORTY PER CENT TO GUY O. MARCHANT AND SIX PER CENT TO C. G. WELLS, BOTH OF TULSA, OKLAHOMA

FLUID CONTROL FOR GAS AND LIQUID SEPARATORS

Application filed December 5, 1929. Serial No. 411,940.

This invention relates to new and useful improvements in fluid controls for gas and liquid separators.

One object of the invention is to provide auxiliary means for operating the fluid controls of a separator if the usual controls for any reason fail to function.

A particular object of the invention is to utilize the fluid pressure to operate the usual controls so as to assure operation under abnormal loads.

A further object of the invention is to utilize the liquid within the separator to set the auxiliary fluid pressure operating means to operate.

Another object of the invention is to provide auxiliary operating means so arranged as not to interfere with the usual operation of the controls under normal loads.

A still further object of the invention is to provide positive means for operating the oil and gas valves of a separator in case the usual float becomes non-buoyant.

A construction designed to carry out the invention will be hereinafter described together with other features of the invention.

Figures 1, 8:
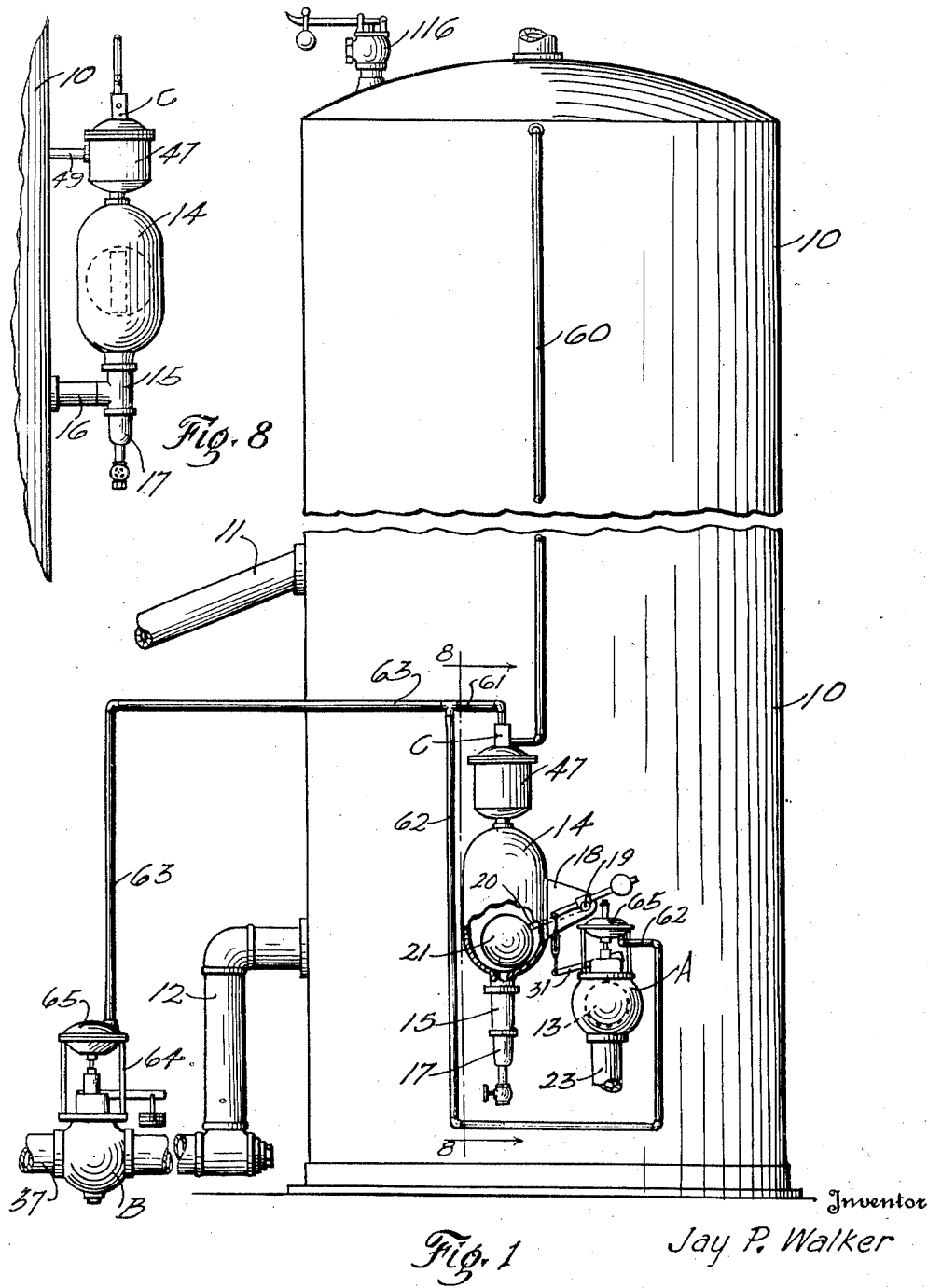
Figure 10:
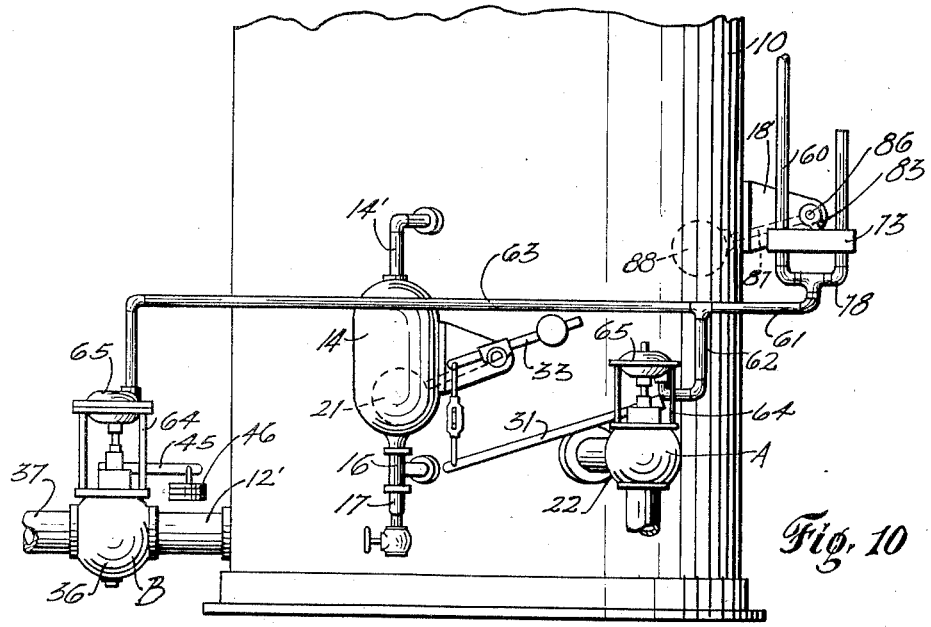
Figure 11:
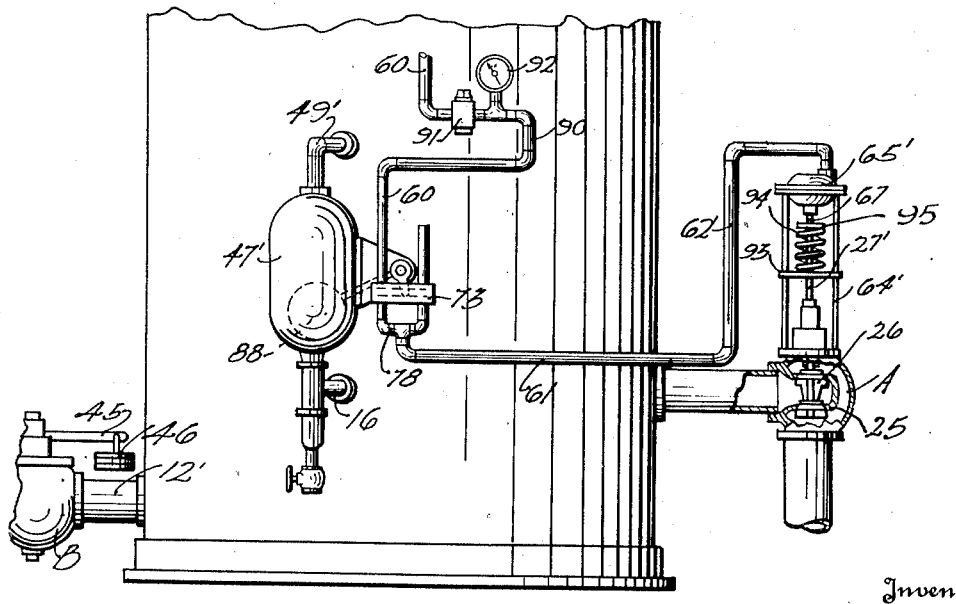

The invention will be more readily understood from a reading of the following specification and by reference to the accompanying drawings in which an example of the invention is shown, and wherein:

Figure 1 is an elevation of an oil and gas separator equipped with auxiliary control-operating means constructed in accordance with the invention, Figure 2 is a vertical sectional view of the pilot valve and component parts, Figures 3, 4 and 5 are details of the oil valve and its operating means, Figures 6 and 7 are details of the gas valve and its operating means, Figure 8 is a transverse vertical sectional view taken on the line 8—8 of Figure 1, Figure 9 is a view partly in elevation and partly in section of another form of the pilot valve, Figure 10 is a partial elevation of a separator showing a modified form of control, Figure 11 is a similar view partly in elevation and partly in section and illustrates a further modification, Figure 12 is a view partly in section and partly in elevation showing still another form, Figure 13 is a sectional view of the piston valve, and Figure 14 is a view of still another form partly in section and partly in elevation.

In the drawings the numeral 10 designates a separator tank having an influent pipe 11. A gas discharge pipe 12 leads from the lower portion of the tank as does also an oil pipe 13 (Figures 1 and 4). The separator tank is provided with a float chamber 14 having connection with the tank by a T 15 and pipe 16. A drain connection 17 leads from the bottom of the T. A bonnet 18 is attached to one side of the chamber 14 and has a rock shaft 19 journaled therein and suitably packed.

A float arm 20 within the bonnet is fastened on the shaft 19 and extends into the chamber 14. A ball float 21 in the chamber is fastened on the end of the arm. Oil or liquid from the tank flows through the parts 15 and 16 into the chamber and elevates the float, whereby the shaft is rocked. An oil discharge control valve A includes a casing 22 connected at one side (Figure 4) to the oil outlet pipe 13 and having a discharge pipe 23 leading from its bottom. The casing has a flanged bonnet 24 secured thereon. Within the casing is a double valve seat 25 receiving valves 26 suspended from a link 27.

A rock shaft 29 is journaled in the bonnet 24 (Figures 3 and 5) and has a crank arm or lever 28 pivoted to the link 27, so that upon rocking said shaft the valves are lifted. A clevis 30 is fastened on the outer end of the shaft and receives one end of a lever 31 which in turn is pivoted to the lower end of a link 32 including a turn buckle. The upper end of the link is pivoted to one end of a lever 33 mounted in a collar 34 secured on the float shaft 19 and having a counterbalance weight 35.

When the float 21 is in its lower position as is shown in Figure 1, the parts are in the position shown in Figures 3 and 4. When the oil in the tank rises above the storage level, said oil will flow into the chamber 14 and elevate the float 21 thus swinging the lever 33 and arm 31 and lifting the valves 26, whereby the oil valve A is opened. As the oil level rises and falls in the tank the oil valve is likewise controlled.

A gas valve B is connected to the gas pipe 12 and is similar to the valve A. The valve B, as is shown in Figures 6 and 7, includes a case 36 connected to the pipe 12 and having a discharge pipe 37 leading therefrom. A flanged bonnet 38 is mounted on top of the case. A double valve seat 39 is provided in the case and receives valves 40 suspended by a link 41.

For closing the valves a crank arm or lever 42 is pivoted to the link and is fastened on a rock shaft 43 journaled in the bonnet 38 and suitably packed. A clevis 44 fastened on the outer end of the shaft receives a lever 45 having a counterbalancing weight 46 on its outer end. When the gas pressure in the tank builds up sufficiently it will overcome the leverage and weight 46 and unseat the valves 40.

All of the parts which have been described are now in common use and the invention has to do with auxiliary means for operating the oil and gas valves.

In carrying out the invention an auxiliary float chamber 47 is screwed onto the nipple 48 at the top of the chamber 14 (Figure 2) so that when the chamber 14 is filled with oil such oil will flow into the chamber 47. The chamber 47 has an overflow pipe 49 connected with the tank 10. Within the chamber 47 is mounted a ball float 50 having a depending stem 51 at its bottom confined in a guide spider 52 mounted on the bottom of the chamber.

On top of the auxiliary chamber is mounted a pilot valve C including a valve block 53 having a central vertical bore 54 which communicates with the chamber. A plunger or piston 55 fastened on top of the float 50 extends into the bore 54. As the ball rises and falls the piston is reciprocated in the bore of the block. The bore has a reduced port 56 at its top and an outlet port 57 in its side. An exhaust port 58 extends from the bore through the block between the ports 56 and 57. When the float 50 is in its lowermost position the exhaust port 58 is open and the outlet port 57 is closed. When the float rises in the auxiliary chamber and the piston strikes the top of the bore the exhaust port 58 is closed and connection between the ports 56 and 57 is made by a port 59 in the piston.

A gas pressure line 60 extends from the top of the tank 10 to the port 57 for supplying a fluid under pressure to the pilot valve. A discharge or outlet pipe 61 extends from the port 56 and has branch pipes 62 and 63. When the float 50 rises fluid under pressure, such as gas, passes from the pipe 60 to the pipe 61 and is distributed equally to the pipes 62 and 63.

On the flange of each bonnet 24 and 38 is mounted upright posts 64 which support a diaphragm housing 65 having a diaphragm 66, as is shown in Figures 3 and 6. Each diaphragm has a depending stem 67 extending through stuffing boxes 68 and 69, respectively. The stuffing box 69 is carried on a hood 70 provided on each bonnet. Each stem 67 has a reduced shank 71 having a collar boss 72 at its lower end.

The link 27 of the oil valve A has an ear 27' at its upper end engaging on the shank 71 of its particular diaphragm housing, while the link 41 of the gas valve B has an ear 41' at its upper end engaging on the shank 71 of its particular diaphragm housing. It will be seen that by reason of the reduced shanks either valve may be lifted by its crank arm and operated in the usual manner without interference from the diaphragm housing.

The branch pipe 62 enters the diaphragm housing of the oil valve below its diaphragm 66 so as to exert pressure and lift the stem 67 and thereby open or unseat the valve 26. A reverse condition is had at the gas valve B where the pipe 63 enters above the diaphragm 66. When gas is admitted to the pipes 62 the oil valve will be opened and when it is admitted to the pipe 63 the gas valve will be closed.

Under ordinary conditions and normal loads the oil and gas valves operate in the usual manner and the auxiliary parts are idle, gas from the pipe 60 being free to escape through the port 58. Such gas may be permitted to escape to the atmosphere or may be piped (not shown) back to the tank. Should the oil level in the tank rise faster than the oil valve A is capable of draining or discharging oil from the tank, such oil will flow from the chamber 14 into the auxiliary chamber 47 and elevate the ball float 50. Should, for any reason, the ball float 21 become non-buoyant this would cause the oil level in the tank to rise just the same as an abnormal load of oil in the tank.

When the float 50 reaches the limit of its upward movement the piston 55 will have closed the port 58 and connection between the pipes 60 and 61 will be established through the port 59. Gas under pressure will be supplied to the diaphragm housing 65. The gas flowing through the pipe 62 will operate the diaphragm of the oil valve A so as to elevate the stem 67, thereby lifting the link 27 and opening the valves 26 to their maximum extent.

In order to force the abnormal quantity of oil out of the tank, it is desirable to hold or increase the gas pressure. Therefore, when the oil valve A is opened by the gas pressure the same gas pressure supplied through the pipe 63 on top of the diaphragm 66 of the gas valve acts to hold the valves 40 seated. This will cause the pressure to build up immediately and thus force the surplus oil out through the valve A. When the oil reaches its maximum level the oil valve A will remain open due to its float 21, but the gas valve will be held closed by its weight 46. This restores the separator to normal conditions.

In Figure 9 I have shown a modified form employing a pilot valve D. This valve includes a slide block 73 suitably supported on the bonnet 18' of an auxiliary chamber 47' connected to the chamber 14 by the nipple 48. The slide block has an inlet port 74 above an outlet port 75 and an exhaust port 76 above an outlet port 77. The pipe 60 is connected to the inlet port 74 and the pipe 61 is connected with a yoke pipe 78, which in turn is connected with the ports 75 and 77.

A slide valve 79 is mounted in the block 73 and has an inlet port 80 and an exhaust port 81. The ports of the valve are arranged so that when the port 80 registers with the ports 74 and 75 the port 81 will be closed and vice versa. A collar 82 is fastened on the shaft 86 suitably mounted in the bonnet. The shaft is rocked by an arm 87 carrying a ball float 88 in the chamber. A finger 83 extending from the collar 82 engages through a slot 84 in the block a slot 85 in the valve.

When the float 88 is in its lowermost position the ports 74 and 75 will be closed, while the ports 76, 77 and 81 will be in registration, thus permitting the gas to exhaust from the pipes 61, 62 and 63. This device will operate under the same conditions as the form previously described.

In Figure 10 the bonnet 18' is attached to the side of the tank 10 and its float 88 extends into the tank so as to be actuated by the rise and fall of the liquid therein. The slide block 73 and component parts, as shown in Figure 9, are connected with the pipes 60 and 61, as in the other figures. The finger 83 for actuating the slide valve is attached to the rock shaft 86, the same as in Figure 9.

The pipe 63 is connected to the gas valve B the same as in the other figures, however, the gas valve has connection with the tank by a pipe 12'. The oil valve A has connection with the pipe 61 by a branch pipe 62, as in Figure 1. The lever 31 of the oil valve is connected with the lever 33 of the float 21 in the same manner as in Figure 1 and the same parts are employed, except the auxiliary float and its chamber 47. Instead of the nipple 48 a pipe 14' is connected into the tank.

It will be seen that under ordinary conditions the float 21 will operate the valve A upon the rise and fall of the liquids in the tank, but should the float 21 fail to operate and the liquid level rise, the float 88 will be operated the same as in Figure 9, thus actuating the valve 73 to permit the gas under pressure to pass by the pipes 61, 62 and 63 to the diaphragm valves and operate the same, thus opening the valve A and closing the valve B.

In Figure 11 the float control means of Figure 9 is employed and the chamber 47' is connected with the tank 10 by means of the pipe 16, as used in Figure 8, and a pipe 49', so as to be connected substantially the same as the chamber 14 in Figure 10. In this form the pipe 60 from the top of the tank is connected to a goose neck 90 which includes a regulating valve 91 in advance of a pressure gage 92. The regulating valve can be set so as to control the passage of fluid through the goose neck 90. The goose neck 90 is connected with the slide valve 73 which is operated by the float 88, the same as in Figure 9. The pipe 61 leading from the valve is connected with a pipe 62' which leads to the top side of a diaphragm housing 65' similar to the housings 65. This housing is supported on posts 64' carried by the oil valve A.

It will be noted in connection with this form of the invention that the gas valve B is not connected with the pipe 61 as in the other forms and its operation is controlled entirely by its counterbalancing weight 46. The double valves 26 are attached to a plunger 27', which is connected to the stem 67 of the diaphragm 66. The posts 64' carry a cross bar 93 which supports a coiled spring 94 surrounding the plunger 27'. A head 95 at the intersection of the stem and plunger bears upon the upper end of the coiled spring and consequently when the diaphragm 66 is forced downward by the pressure fluid the spring 94 is compressed and the valve 26 is opened. When the pressure is reduced so as to be overcome by the tension of the spring 94 the plunger will be elevated and the oil valve closed. This form operates strictly as a primary oil or liquid control rather than an auxiliary control, the float 88 taking the place of the float 21.

In Figures 12 and 13 I have shown another form wherein the hydrostatic pressure of the liquids is used to operate a fluid pressure control valve instead of a float. In this form an oil pipe 96 is connected to the tank 10 below the oil valve A and carries an elbow 97, which supports a diaphragm housing 98 having a diaphragm 99 therein. An upright cylinder 100 is connected in the top of the case of the diaphragm housing and has a piston valve 101 slidable therein.

A fluid pressure supply pipe 60 is connected to a T 102 from which a branch pipe 103 extends into the cylinder 100. Another branch pipe 104 extends from the T to the top of the diaphragm housing 98. The valve 101 has a stem 105 extending from its lower end and connected to the diaphragm 99. As is shown best in Figure 13, the valve 101 normally rests upon stops 106. A coiled spring 107 surrounds the stem between the diaphragm and said stops and consequently when the diaphragm is forced upwardly the spring will be compressed.

It will be seen that so long as the hydrostatic pressure is equal to the fluid pressure, combined with the resistance offered by the spring 107, the diaphragm 99 will remain in a central or neutral position, but when the hydrostatic pressure of the fluids beneath the diaphragm overcome the resistance above the diaphragm, said diaphragm will be expanded upwardly and the piston valve 101 thus elevated, whereby the spring is compressed. The cylinder 100 has a suitable vent 108 at its top to permit free movement of the piston valve.

An exhaust pipe 109 leads from the cylinder and spaced discharge pipes 110 and 111 also extend from the cylinder in spaced relation. The pipe 110 leads to the diaphragm housing 65 of the oil valve A, while the pipe 111 leads to the diaphragm housing 65 of the gas pipe B. When the piston valve is resting upon the stops 106 the admission of the pressure fluid is cut off, as is shown in full lines in Figure 13, but the pipe 110 is connected with the pipe 109 by a duct 112 in the piston valve and the pipe 111 is connected with the vent 108 by another duct 113 in the piston valve. These ducts are separated by an abutment 114.

The piston valve at its lower end has a transverse port 115 connecting with the duct 112. When the valve is elevated the port 115 will connect with the pipe 103, as is indicated in dotted lines in Figure 13, and the duct 112 is long enough to connect the pipes 110 and 111 so that the pressure fluid will be supplied to said pipes. The valves A and B will then be operated the same as in Figure 1. It is obvious that the valve A could be connected with the float 21 the same as in Figure 10, and this form of the invention is presented either as a primary operator or an auxiliary operator.

In Figure 14 I have shown a form somewhat similar to Figure 10, except that the controlling float and valve of Figure 11 are employed. It is believed that by applying the reference numerals of these parts to Figure 14 its construction and operation will be clearly understood.

It is pointed out that as the pressure builds up inside the separator tank the greater the pressure exerted on each diaphragm, thus insuring the wide open position of the oil valves and positive closing of the semi-balanced gas valves, which results in a still further building up of pressure in the tank. Many more cubic feet of gas under pressure are in the separator than cubic feet of oil, but the building up of gas pressure requires a longer time for volume built up than for the oil pressure and, of course, a much greater quantity of gas in cubic feet enters the tank than the quantity of oil or liquids received.

The gas valve B, unless subjected to extreme pressure, will not close off altogether, owing to its counterbalancing weight, and consequently acts to some extent as a safety valve; however, a safety valve 116 of ample capacity is advisedly used on the tank 10, as is shown in Figure 1. In connection with the spring actuated valves of Figures 11 and 12 it is pointed out that this gives an intermittent expulsion and the liquids when expelled pass out in a full sized stream. The spring assures positive seating of the valve and prevents sand from cutting out the valve seat by seeping past the valve where valve is not positively closed.

Various changes in the size and shape of the different parts, as well as modifications and alterations, may be made within the scope of the appended claims.

What I claim, is:

1. In a fluid control for separators, the combination with the oil outlet valve and the gas outlet valve of a separator, of fluid pressure actuated means for operating said valves, and means actuated by the rise and fall of the liquid in the separator for controlling the supply of pressure fluid to said actuating means.

2. In a fluid control for separators, the combination of a separator tank, a gas valve, an oil valve, a float connected with the separator tank for operating the oil valve, and means actuated by an abnormal rise of liquid in the separator tank for closing the gas and opening the oil valve to its maximum independently of the float, whereby the fluid pressure is built up and the surplus of oil is expelled.

3. In a fluid control for separators, the combination of a separator tank, a gas valve, an oil valve, a float connected with the separator tank for operating the oil valve, fluid pressure operators connected to the valves, means for conducting pressure fluid from the separator tank to said operators, and a controlling device for said conducting means actuated by the rise and fall of the liquid in said separator.

4. In a fluid control for separators, the combination of a separator tank, an oil outlet valve and gas outlet valve connected with the separator tank, fluid pressure operators for the valves, means for conducting a pressure fluid from the separator tank to said operators, a pilot valve connected in said conducting means, and means actuated by the rise and fall of the liquid in the tank for operating the pilot valve.

5. In a fluid control for separators, the combination of a separator tank, an oil outlet valve and gas outlet valve connected with the separator tank, fluid pressure operators for the valves, means for conducting a pressure fluid from the separator tank to said operators, a pilot valve connected in said conducting means, a float chamber connected to the separator tank, and a float in the chamber connected with said pilot valve.

6. The method of separating gas and liquids which consists in maintaining a predetermined gas pressure within a tank and also maintaining a normal liquid level in said tank separating the influent within the tank to segregate the gas and liquids, and utilizing the gas pressure to close the gas outlet valve and to open the liquid outlet valve when the liquid rises above its normal level.

7. In a fluid control for oil and gas separators, the combination of a tank having oil and gas outlet valves, means for closing the gas valve, means for operating the oil valve, diaphragms connected with the valves for actuating the latter independently of their first mentioned closing and operating means, a control device actuated by the rise and fall of the liquid in the tank, a conductor leading from the gas space of the tank to the control device, and conductors leading from the control device to the diaphragms.

8. In a fluid control for oil and gas separators, the combination of a tank having gas and oil outlet valves, means for closing the gas valve, a float chamber connected to the tank, a float in the chamber for operating the oil valve, an auxiliary float chamber connected to the first chamber, a pilot valve connected with the auxiliary chamber, a pressure fluid conductor leading from the gas space of the tank to the pilot valve, a float in the auxiliary chamber connected with the pilot valve for operating the same, diaphragms connected with the oil and gas valves for actuating the latter independently of the closing and float actuating means, and pressure fluid conductors leading from the pilot valve to the diaphragms.

In testimony whereof I affix my signature.

JAY P. WALKER.